Nov. 30, 1948.  R. E. BLANTON  2,455,216
VEHICLE WHEEL MOUNTING
Filed Dec. 4, 1945
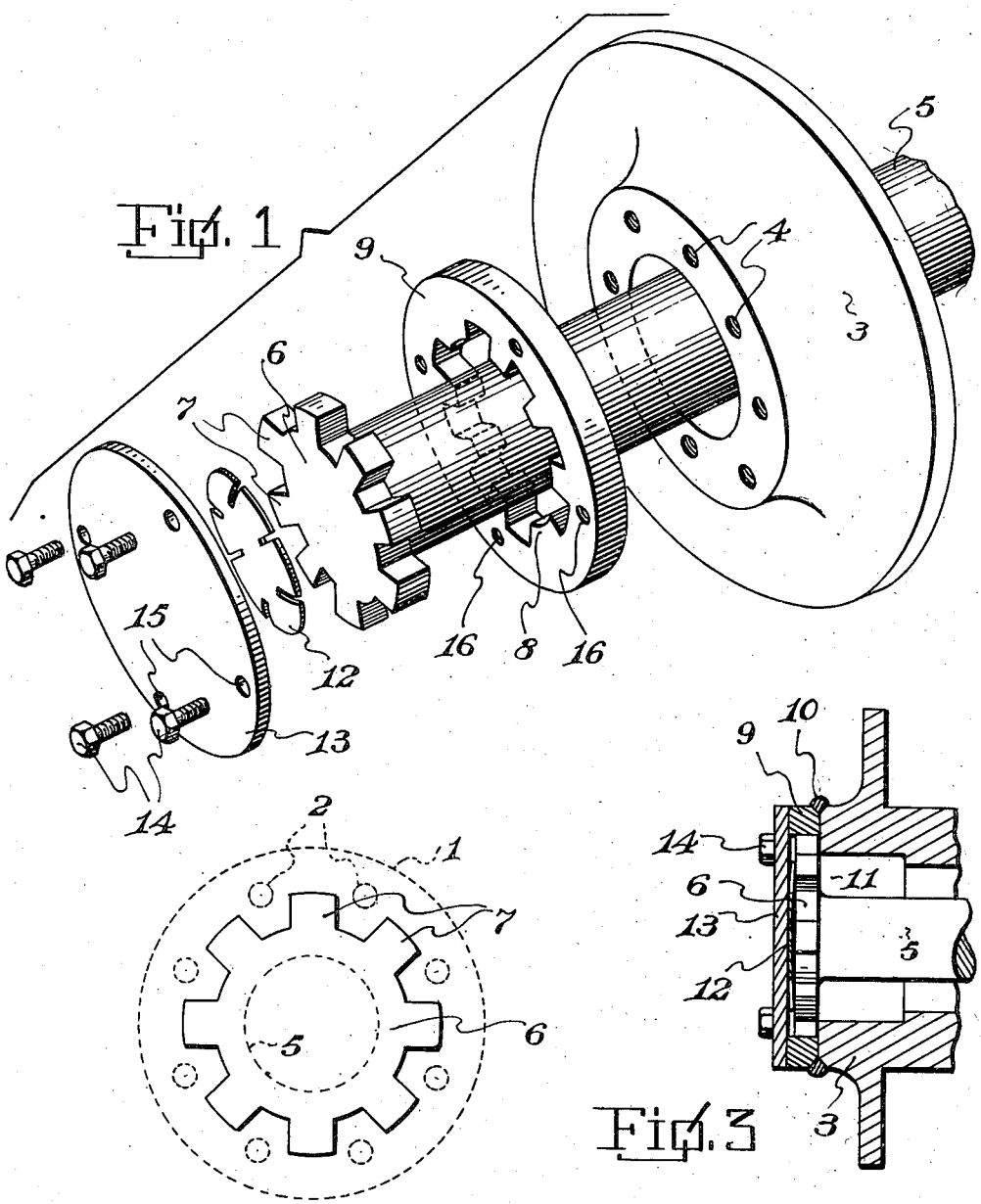
Ray E. Blanton
INVENTOR.
ATTORNEY.

Patented Nov. 30, 1948

2,455,216

UNITED STATES PATENT OFFICE 2,455,216

VEHICLE WHEEL MOUNTING

Ray E. Blanton, Tulsa, Okla.

Application December 4, 1945, Serial No. 632,650

3 Claims. (Cl. 287—53)

1

The invention relates to vehicle wheel mountings for attaching the wheel to a driven axle and has for its object to provide a mounting wherein the axle will have a floating connection with the wheel, thereby preventing bending strains on the axle and overcoming the difficulty now experienced where the axle is rigidly connected to the wheel hub, and the common danger of broken axles.

A further object is to provide a wheel mounting for a driven axle wherein there is a toothed interengagement between a member carried by the wheel hub and the axle, thereby allowing a rocking movement in the connection.

A further object is to provide an internally toothed ring, rigidly secured to the wheel hub, and in which toothed ring the teeth of a flange, carried by an axle, interengage, and a cover plate carried by the internally toothed ring in spaced relation to the toothed flange on the axle, and spring means interposed between the cover plate and the end of the axle.

With the above and other objects in view the invention resides in the combination and arrangement of parts as hereinafter set forth, shown in the drawing, described and claimed, it being understood that changes in the precise embodiment of the invention may be made within the scope of what is claimed, without departing from the spirit of the invention.

In the drawing:

Figure 1 is a collective detail perspective view of the wheel and axle assembly, showing the parts in position to be assembled.

Figure 2 is an end view of the axle showing the splined axle flange after being cut down from the dotted line position, which shows the conventional form of axle flange.

Figure 3 is a vertical transverse sectional view through the connection and wheel hub.

Referring to the drawing, the numeral 1, in Figure 2, designates the conventional shape of axle flange, having apertures 2 therein for the reception of studs, which were threaded into wheel hub 3 in the threaded apertures 4. In the old construction the studs became loose, the threads distorted, consequently bending strains were placed on the driven axle 5, which axle would often break and cause accidents. The axle flange 2 is cut down from the dotted line shape, shown in Figure 2, to the full line shape in Figure 2, thereby forming a splined axle flange 6 integral with the axle, and provided with any number of teeth 7 desired. The number of teeth correspond to the number of teeth 8 in the splined ring 9, and are adapted to interengage each other for forming

2 a slight rocking engagement and at the same time positive driving connection. The splined ring 9 is secured to the outer face of the hub 3 by welding at 10, and it will be noted that the splined flange 6 is slightly larger than the chamber 11 of the hub, hence maintains the hub and wheel on the axle at all times.

The splined flange 6 is narrower than the ring 9 so that a spring washer 12 can be interposed between the outer end of the axle 5 and the cover plate 13. This washer yields slightly to accommodate the structure to slight axial misalinements. The cover plate is held in position by cap screws 14, which extend through apertures 15, and into the threaded apertures 16 in the splined ring, therefore it will be seen that a rigid structure is provided which allows slight movements of the wheel sidewise to relieve the bending strain on the driven axle.

From the above it will be seen that a wheel mounting is provided which is simple in construction, positive in its operation, and one wherein old axle flanges may be easily cut down and reshaped for the new assembly.

The invention having been set forth what is claimed as new and useful is:

1. A driving connection between a wheel hub and a driven axle extending through the hub, said connection comprising a narrow splined member secured to the outer face of the hub, a narrow splined flange carried by the axle and interengaging the first mentioned splined member, said last named splined member being transversely rockable in the first mentioned splined member, a cover plate secured to the first mentioned splined member and a spring member interposed between the cover plate and the end of the axle.

2. A device as set forth in claim 1 wherein the splined flange of the axle is narrower than the splined member carried by the wheel hub.

3. A device as set forth in claim 1 wherein the splined flange carried by the axle hub is larger in diameter than the hole extending through the wheel hub and engaging the outer face of the hub.

RAY E. BLANTON.

REFERENCES CITED

The following references are of record in the file of this patent:

UNITED STATES PATENTS

| Number | Name | Date |
|---|---|---|
| 1,370,073 | Utz | Mar. 1, 1921 |
| 1,790,737 | Alborn | Feb. 3, 1931 |
| 2,322,402 | Stuart | June 22, 1942 |